(12) United States Patent
Bangalore Srinivas et al.

(10) Patent No.: US 11,904,774 B2
(45) Date of Patent: Feb. 20, 2024

(54) VEHICLE MIRROR WIPING UNIT

(71) Applicant: Tata Consultancy Services Limited, Mumbai (IN)

(72) Inventors: Venkatesh Prasad Bangalore Srinivas, Bangalore (IN); Vivek Kumar, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 17/893,237

(22) Filed: Aug. 23, 2022

(65) Prior Publication Data
US 2023/0105928 A1    Apr. 6, 2023

(30) Foreign Application Priority Data

Sep. 7, 2021  (IN) .............................. 202121040618

(51) Int. Cl.
| | | |
|---|---|---|
| *B60R 1/06* | (2006.01) | |
| *B60R 1/072* | (2006.01) | |
| *B60S 1/56* | (2006.01) | |
| *B60S 1/34* | (2006.01) | |

(52) U.S. Cl.
CPC ............ *B60R 1/0602* (2013.01); *B60R 1/072* (2013.01); *B60S 1/566* (2013.01); *B60S 1/3404* (2013.01)

(58) Field of Classification Search
CPC .......... B60S 1/566; B60S 1/60; B60S 1/3404; B60R 1/0602; B60R 1/072
USPC .................................................. 15/250.003
See application file for complete search history.

(56) References Cited

U.S. PATENT DOCUMENTS

| | | | |
|---|---|---|---|
| 5,007,722 A * | 4/1991 | Mori ..................... | B60R 1/0602 |
| | | | 359/507 |
| 6,546,590 B2 | 4/2003 | Waters | |
| 6,691,365 B2 | 2/2004 | Graf | |

FOREIGN PATENT DOCUMENTS

| | | |
|---|---|---|
| CN | 106240469 A | 12/2016 |
| JP | S 61-215143 A | 9/1986 |
| WO | WO 2005/019006 A1 | 3/2005 |

OTHER PUBLICATIONS

Machine translation of description portion of Japanese publication 61-215143, published Sep. 1986. (Year: 1986).*

* cited by examiner

*Primary Examiner* — Gary K. Graham
(74) *Attorney, Agent, or Firm* — Finnegan, Henderson, Farabow, Garrett & Dunner, LLP (57) ABSTRACT

Wiper is utilized to clean side-view mirror of a vehicle. Existing wiper attached with the side-view mirror obstructs visibility of a driver while cleaning the side-view mirror in a rainy season or in a dusty environment, which leads to an accident. A vehicle mirror wiping unit is provided. The vehicle mirror wiping unit includes a mirror; a mirror shutter assembly; a mirror casing; a mirror mounting unit, consisting of: the mirror, a mirror spring, a spring retaining cap, and a mirror spring holder; a pin pass through a cut-out of the spring retaining cap, and a cut-out in the mirror spring holder; and a cleaning elastomer is triggered by the mirror shutter motor, and the mirror shutter moves from the first end of the mirror to the second end of the mirror. A frontal surface of the mirror shutter is a reflective surface functioning as a mirror.

10 Claims, 8 Drawing Sheets

VEHICLE MIRROR WIPING UNIT

PRIORITY CLAIM

This U.S. patent application claims priority under 35 U.S.C. § 119 to: India Application No. 202121040618, filed on Sep. 7, 2021. The entire contents of the aforementioned application are incorporated herein by reference.

TECHNICAL FIELD

This disclosure relates generally to cleaning system, and, more particularly, to a vehicle mirror wiping unit.

BACKGROUND

In transportation system, a wiper attached in a side-view mirror of a vehicle is utilized to clean dust or rain droplets settled in the side-view mirror of the vehicle like, car, truck etc. Visibility problem arises for driver of the vehicle during rainy season or in a dusty environment, which leads to an accident. At present, there are wiper attached either visibly or adjusted sideways on the side view mirror. The driver's view is obstructed when the wiper of the side view mirror is operational as there is no mirror surface available in the wiper. The mechanism of the wiper attached to the side view mirror is entirely complex. Wear and tear of the existing wipers is high. In some scenario, the wiper is mounted on one or more rollers in guideways resulting in mechanism failure due to a misalignment problem. Existing wipers are not flexible and when they collapse, still partially obstruct the driver's view leading towards distraction which is a safety aspect. There is a need for a wiper to overcome the problem of obstruction arises to the driver's view.

SUMMARY

Embodiments of the present disclosure present technological improvements as solutions to one or more of the above-mentioned technical problems recognized by the inventors in conventional systems. For example, in one embodiment, a vehicle mirror wiping unit is provided. The vehicle mirror wiping unit include a mirror; a mirror shutter assembly, consisting of: (i) a mirror shutter holder, (ii) a mirror shutter, and (iii) a mirror shutter motor; a mirror casing mounted with the mirror motor; a mirror mounting unit consisting of: (i) the mirror, (ii) a mirror spring, (iii) a spring retaining cap, and (iv) a mirror spring holder; a pin passing through a cut-out of the spring retaining cap, and a cut-out in the mirror spring holder; and a cleaning elastomer triggered by the mirror shutter motor, and the cleaning elastomer along with the mirror shutter moves from a first end of the mirror to a second end of the mirror. The mirror is integral mounted on to a mirror shaft. The mirror spring holder is assembled with the mirror spring and the spring retaining cap. The mirror motor is connected to the mirror mounting unit through a motor shaft. The motor shaft passes through a hook. The mirror motor is actuated in a linear motion to pull the mirror from the first end to the second end or vice versa. A frontal surface of the mirror shutter is a reflective surface functioning as a mirror.

The mirror spring is compressed, and the pin is fastened on to the mirror shaft from inside of a vertical slot of the mirror spring holder. The spring retaining cap is fixed fastened with a plurality of screws. The mirror shutter is attached to a shutter spindle on which the mirror shutter is rolled. The mirror shutter along with the shutter spindle is mounted on a space provided in the mirror shutter holder. The mirror shutter motor is mounted on the mirror shutter holder and connected to the shutter spindle. The mirror shutter is rolled up to the first end to cover the mirror and is rolled down to the second end to uncover the mirror by actuating the mirror shutter motor. The cleaning elastomer in the mirror shutter wipes the mirror. The mirror shutter motor is actuated when the mirror is completely pulled back. The mirror shutter motor is actuated in a rotary motion to pull the mirror from a bottom direction to a top direction.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Embodiments of the present disclosure provide a vehicle mirror wiping unit which is hidden, inside a mirror casing. A driver of a vehicle can trigger the hidden wiping unit to show up for wiping the vehicle mirror at any time needed. The vehicle mirror wiping unit is designed in such a way to not obstruct view of the driver while cleaning the side view mirror of the vehicle. The vehicle mirror wiping unit which moves bottom to top and retracts to bottom totally hiding itself when not in operation. The motor pulls whole front mirror towards back and then starts the wiping mechanism.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

Reference numerals of one or more components of the vehicle mirror wiping unit, as depicted in the FIG. 1 through FIG. 4 are provided in Table 1 below for ease of description.

TABLE 1

| S.NO | NAME OF COMPONENT | REFERENCE NUMERALS |
| --- | --- | --- |
| 1 | Vehicle mirror wiping unit | 100 |
| 2 | Mirror casing | 102 |
| 3 | Mirror shutter holder | 202 |
| 4 | Mirror | 204 |
| 5 | Mirror shutter | 206 |
| 6 | Mirror shutter motor | 208 |
| 7 | Mirror motor | 210 |
| 8 | Mirror spring holder | 212 |
| 9 | Mirror spring | 214 |
| 10 | Spring retaining cap | 216 |
| 11 | Motor shaft | 218 |
| 12 | Mirror mounting unit | 300 |
| 13 | Pin | 302 |
| 14 | Mirror shaft | 304 |
| 15 | Hook | 306 |
| 16 | Cut-out in the spring retaining cap | 308 |
| 17 | Cut-out in the mirror spring holder | 310 |
| 18 | Cleaning elastomer | 312 |
| 19 | Mirror shutter assembly | 400 |
| 20 | Shutter spindle | 402 |

Figure 1:
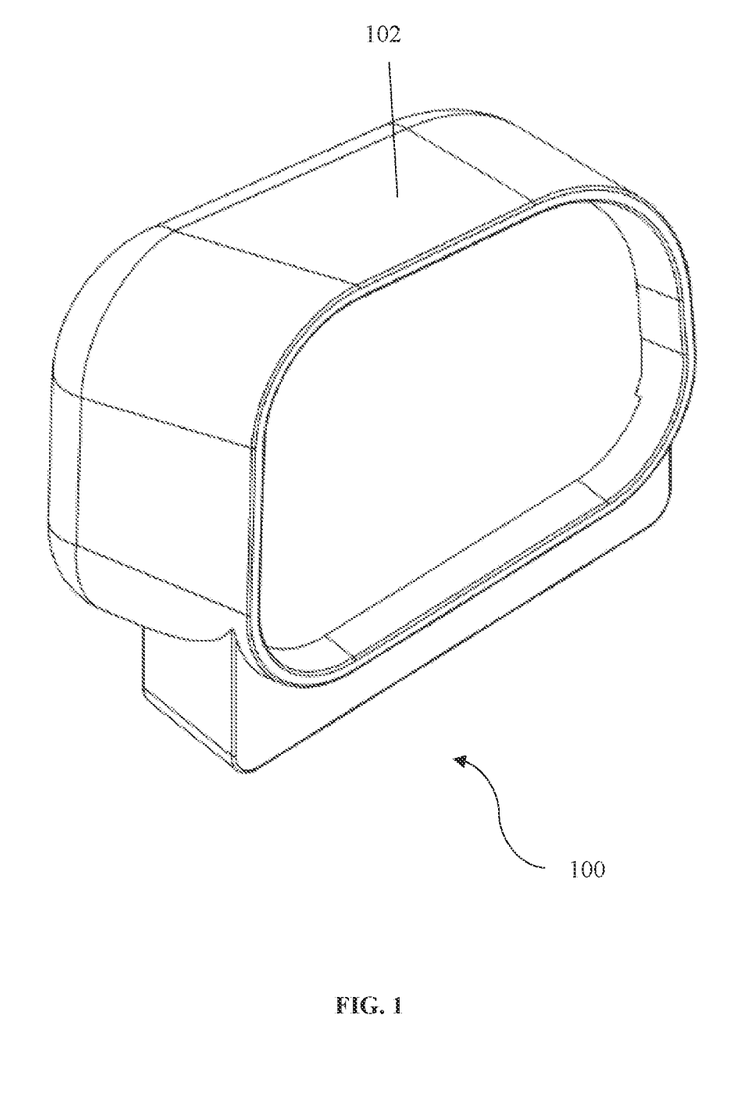
FIG. 1 is an isometric view of a vehicle mirror wiping unit, according to some embodiments of the present disclosure.
Figure 2A:
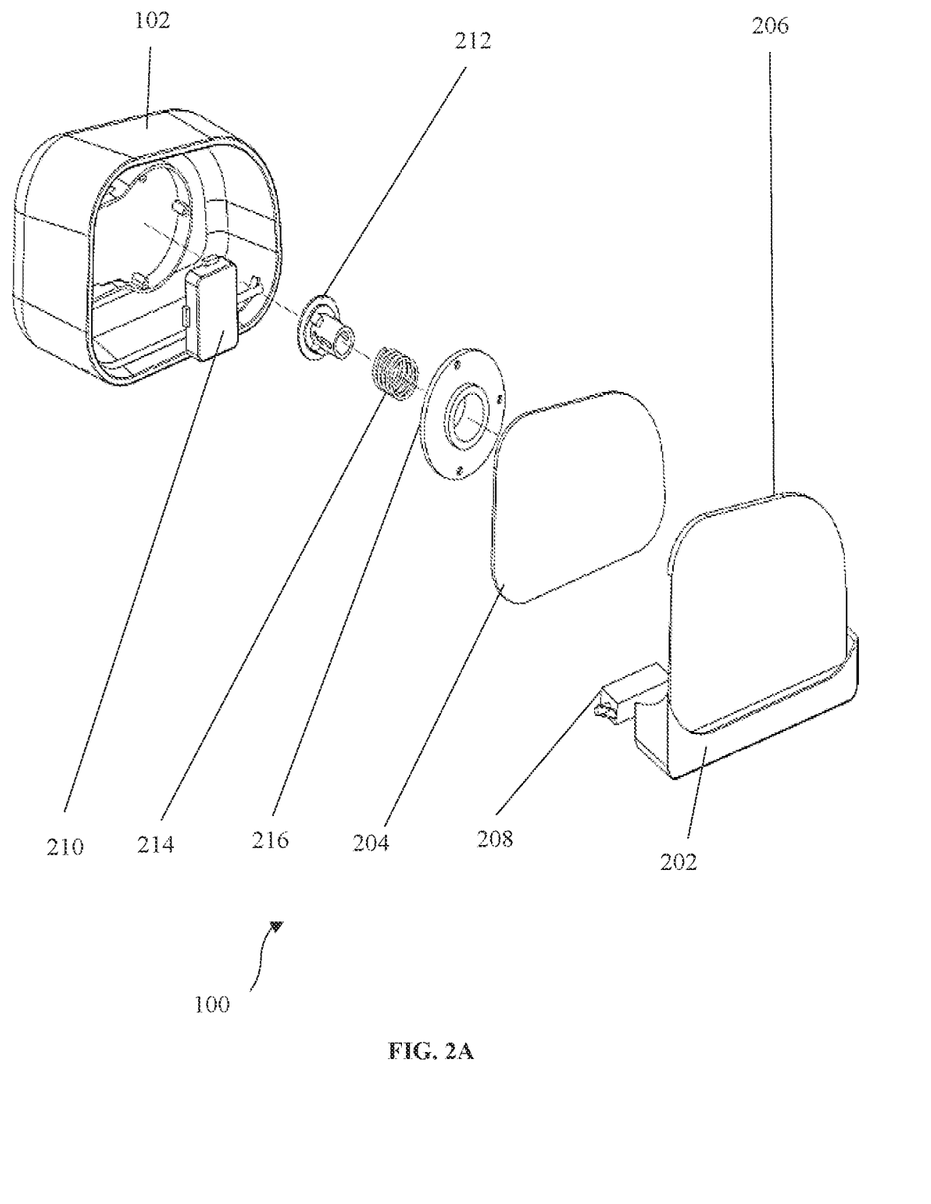
FIGS. 2A-2B are exploded views of the vehicle mirror wiping unit, according to some embodiments of the present disclosure.
Figure 2B:
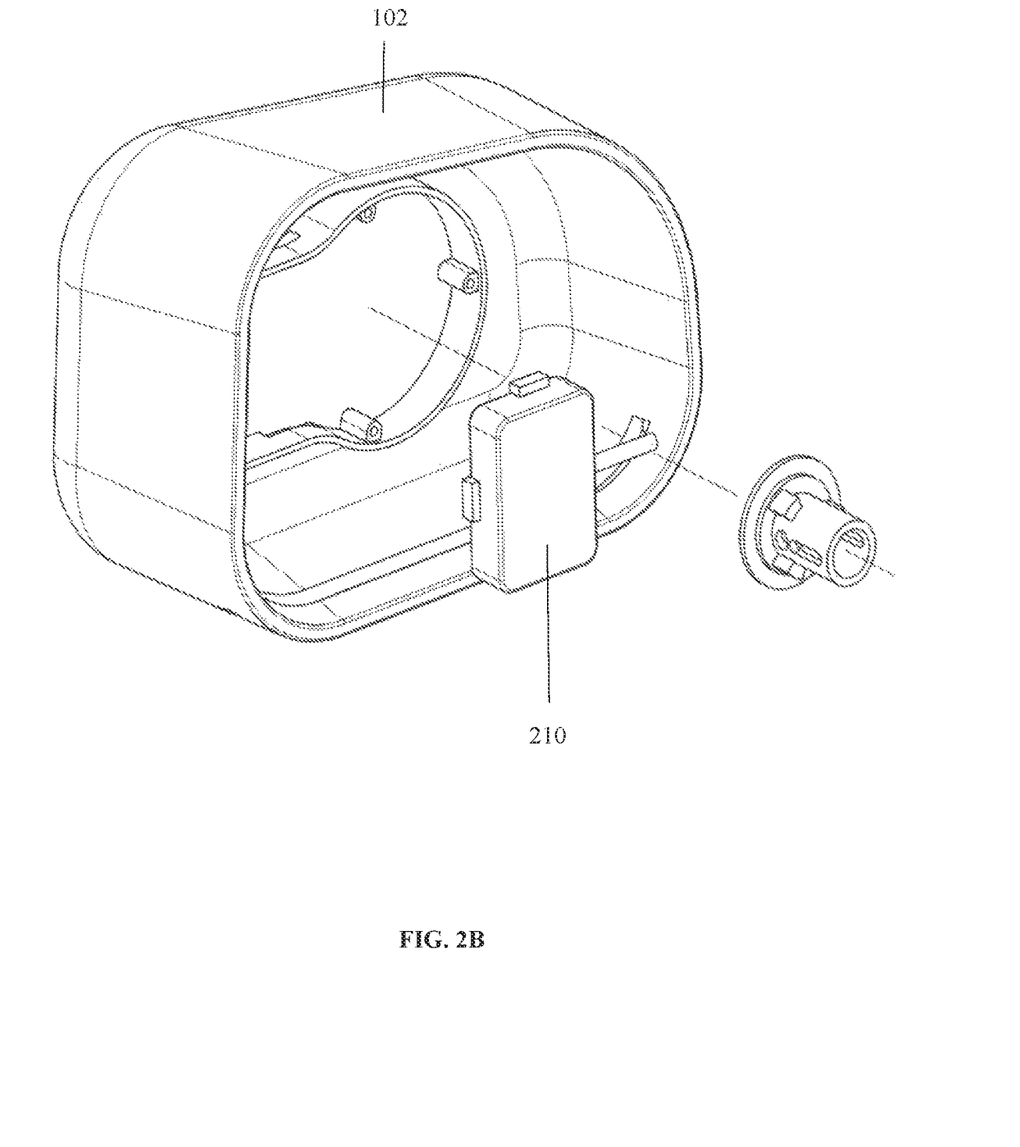
Figure 2C:
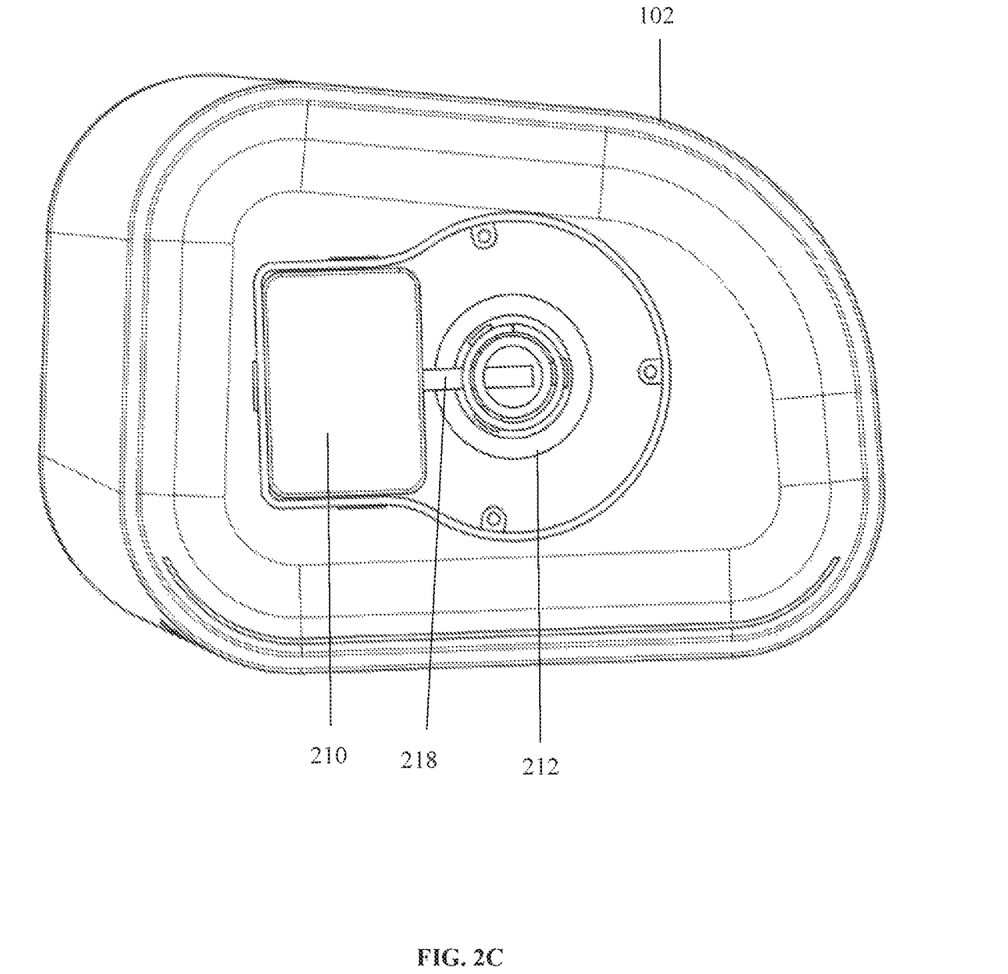
FIG. 2C is a front view of the vehicle mirror wiping unit, according to some embodiments of the present disclosure.
Figure 3A:
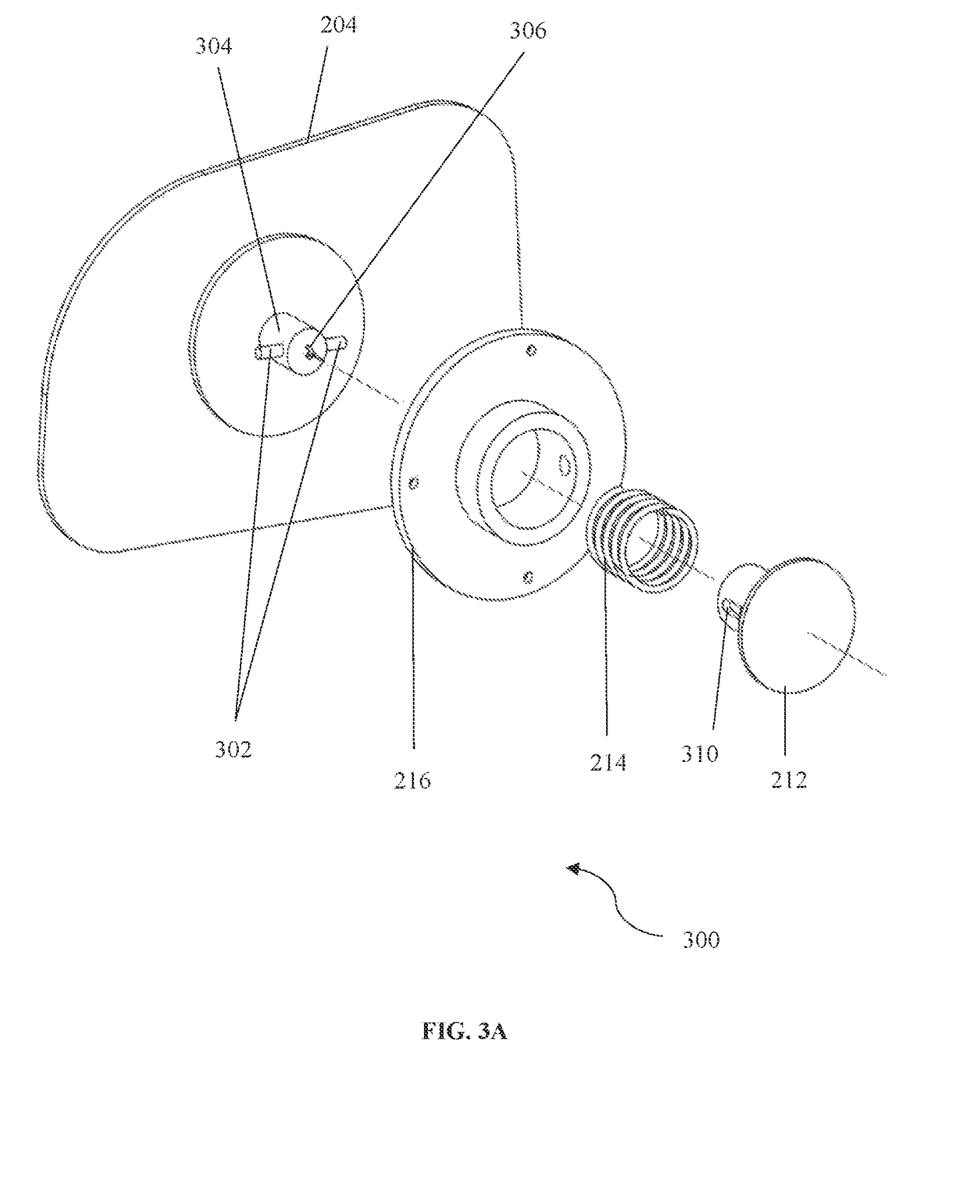
FIG. 3A is an exploded isometric view of a mirror mounting unit of the vehicle mirror wiping unit, according to some embodiments of the present disclosure.
Figure 3B:
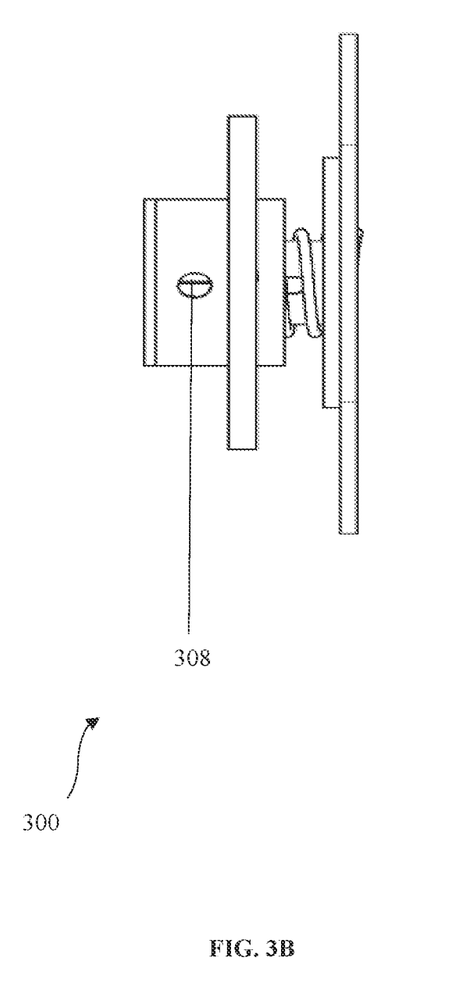
FIG. 3B is a side view of the mirror mounting unit of the vehicle mirror wiping unit, according to some embodiments of the present disclosure.
Figure 3C:
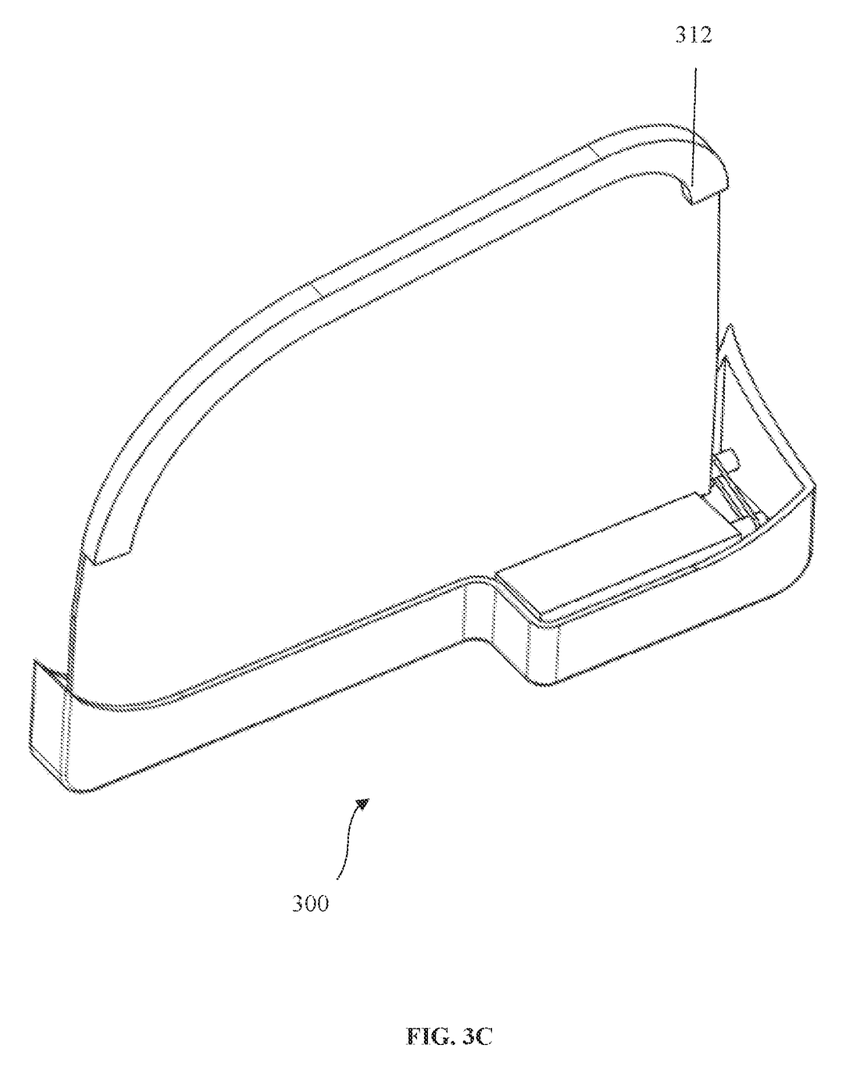
FIG. 3C is an isometric rear view of the mirror mounting unit of the vehicle mirror wiping unit, according to some embodiments of the present disclosure.
Figure 4:
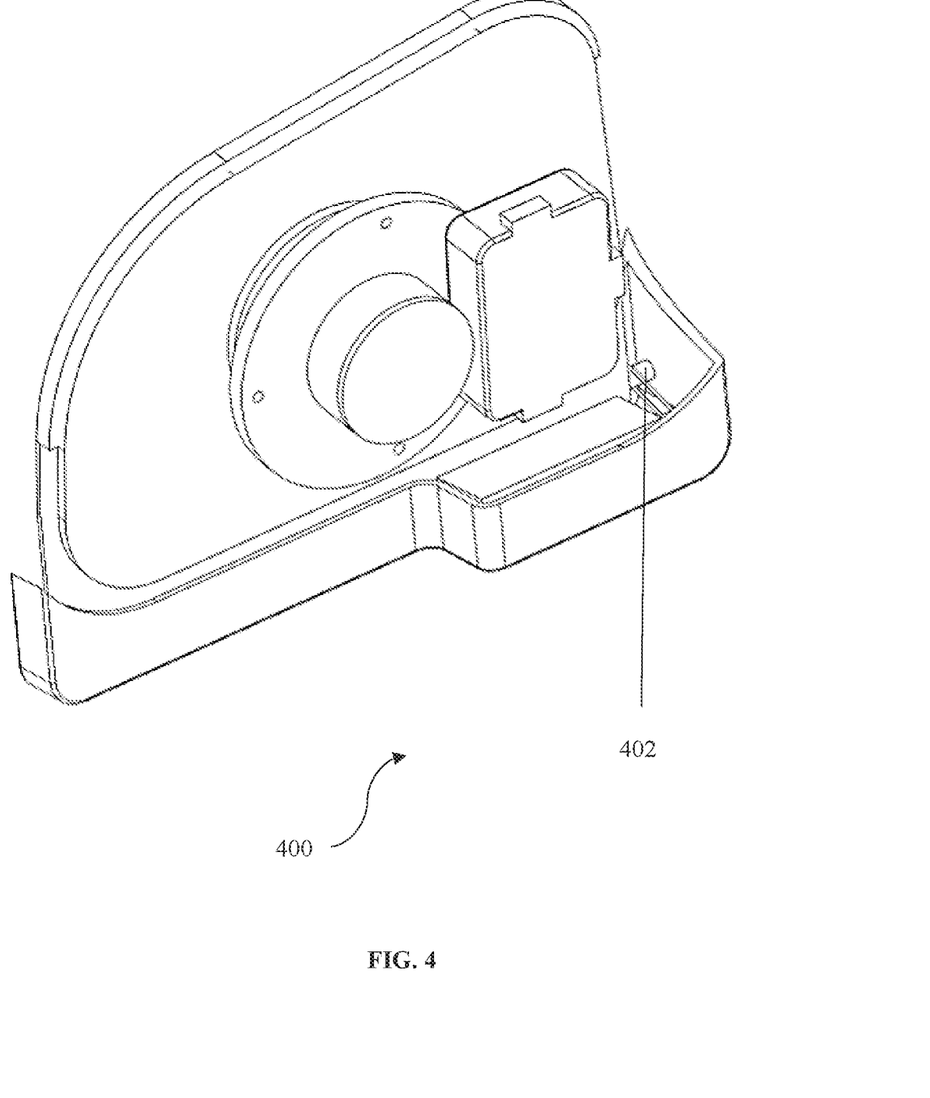
FIG. 4 is an isometric rear view of a mirror shutter assembly of the vehicle mirror wiping unit, according to some embodiments of the present disclosure.

FIG. 1 is an isometric view of the vehicle mirror wiping unit 100, according to some embodiments of the present disclosure. FIGS. 2A-2B are exploded views of the vehicle mirror wiping unit 100, according to some embodiments of the present disclosure. FIG. 2C is a front view of the vehicle mirror wiping unit 100, according to some embodiments of the present disclosure. FIG. 3A is an exploded isometric view of the mirror mounting unit 300 of the vehicle mirror wiping unit 100, according to some embodiments of the present disclosure. FIG. 3B is a side view of the mirror mounting unit 300 of the vehicle mirror wiping unit 100, according to some embodiments of the present disclosure. FIG. 3C is an isometric rear view of the mirror mounting unit 300 of the vehicle mirror wiping unit 100, according to some embodiments of the present disclosure. FIG. 4 is an isometric rear view of the mirror shutter assembly 400 of the vehicle mirror wiping unit 100, according to some embodiments of the present disclosure. The vehicle mirror wiping unit 100 consisting of: (a) the mirror 204 as depicted in FIG. 2A; (b) the mirror shutter assembly 400 as depicted in FIG. 4; (c) as depicted in FIG. 2A, the mirror casing 102 mounted with the mirror motor 210; (d) the mirror mounting unit 300 as depicted in FIGS. 3A-3C; (e) as depicted in FIGS. 3A-3C, the pin 302 passing through the cut-out 308 of the spring retaining cap 216, and the cut-out 310 in the mirror spring holder 212; and (f) as depicted in FIG. 3C, the cleaning elastomer 312 triggered by the mirror shutter motor 208. The cleaning elastomer 312 along with the mirror shutter 206 moves from the first end of the mirror 204 to the second end of the mirror 204 or vice versa. The cleaning elastomer 312 in the mirror shutter 206 wipes the mirror 204. In an embodiment, the cleaning elastomer 312 is a cleaning foam, or a cleaning sponge. The mirror shutter motor 208 is actuated when the mirror 204 is completely pulled back. The mirror shutter motor 208 is actuated in a rotary motion to pull the mirror 204 from a bottom direction to a top direction. In an embodiment, a sensor (not depicted in drawings) corresponds to a position sensor for detecting a position of the mirror shutter 206. For example, the position can be a bottom end or a top end of the mirror 204. A frontal surface of the mirror shutter (206) is a reflective surface functioning as a mirror until cleaning of the mirror (204) is completed.

The mirror shutter assembly 400, consisting of: (i) the mirror shutter holder 202, (ii) the mirror shutter 206, and (iii) the mirror shutter motor 208. The mirror mounting unit 300, consisting of: (i) the mirror 204, (ii) the mirror spring 214, (iii) the spring retaining cap 216, and (iv) the mirror spring holder 212. In an embodiment, the vehicle mirror wiping unit 100 can be alternatively referred as a side-view mirror wiping unit 100. For example, a vehicle can be a car, a truck etc. For example, a mirror of the vehicle can be a side-view mirror of a car. In an embodiment, the cut-out 308 and 310 can be a hole, or a slot etc.

The mirror 204 is integral mounted on to the mirror shaft 304. The mirror spring holder 212 is assembled with the mirror spring 214 and the spring retaining cap 216. The mirror motor 210 is connected to the mirror mounting unit 300 through the motor shaft 218. The motor shaft 218 passes through the hook 306. The mirror motor 210 is actuated in a linear motion to pull the mirror 204 from the first end to the second end or vice versa. The mirror spring 214 is compressed, and the pin 302 is fastened on to the mirror shaft 304 from inside of a vertical slot of the mirror spring holder 212.

The spring retaining cap 216 is fixed fastened with a plurality of screws. As depicted in FIG. 4, the mirror shutter 206 is attached to the shutter spindle 402 on which the mirror shutter 206 is rolled. The mirror shutter 206 along with the shutter spindle 402 is mounted on a space provided in the mirror shutter holder 202. The mirror shutter motor 208 is mounted on the mirror shutter holder 202 and connected to the shutter spindle 402. The mirror shutter 206 is rolled up to the first end to cover the mirror 204 and is rolled down to the second end to uncover the mirror 204 by actuating the mirror shutter motor 208.

The embodiments of present disclosure herein addresses unresolved problem of obstruction of a driver's view arises while cleaning the side view mirror of the vehicle. The embodiment thus provides the vehicle mirror wiping unit. The vehicle mirror wiping unit are hidden, look like a normal glass, and the driver of the vehicle can trigger the hidden wiping unit for wiping the side view mirror at any time needed. The vehicle mirror wiping unit is designed with combination of foam, plastic, and metal parts which are replaceable and serviceable. The vehicle mirror wiping unit does not obstruct view of the driver while cleaning the side view mirror. The design of the vehicle mirror wiping unit is compatible for cleaning any kind of fixed mirror. The vehicle mirror wiping unit include a linear and a rotary actuation mechanism. Entire surface of the vehicle mirror wiping unit that wipes does not block the view and include a mirror surface, hidden wiper (e.g., flap) when not in operation.

The vehicle mirror wiping unit which moves bottom to top and retracts to bottom totally hiding itself when not in operation. The motor pulls whole front mirror towards back and then wiping is initiated. The vehicle mirror wiping unit includes one or more guideways but there are no rolling elements. The vehicle mirror wiping unit is of low friction material which slides in the guideways. The vehicle mirror wiping unit in which the wiper includes a flexible plastic roll with foam gets concealed inside body of the side view mirror when not in use, thereby no obstruction in driver's view. The mirror moves backward and then the mirror shutter include the mirror surface. Accordingly, the shutter is fully expandable, and view is not obstructed, or the driver's view is functional all the time. A frontal surface of the mirror shutter is a reflective surface functioning as a mirror until cleaning of the mirror is completed. Hence, the driver's view is unobstructed, and accidents are avoided.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A vehicle mirror wiping unit (100), comprising:
   a mirror (204), wherein the mirror (204) is integral mounted on to a mirror shaft (304);
   a mirror shutter assembly (400), consisting of: (i) a mirror shutter holder (202), (ii) a mirror shutter (206), and (iii) a mirror shutter motor (208);
   a mirror casing (102) mounted with a mirror motor (210);
   a mirror mounting unit (300), consisting of: (i) the mirror (204), (ii) a mirror spring (214), (iii) a spring retaining cap (216), and (iv) a mirror spring holder (212), wherein the mirror spring holder (212) is assembled with the mirror spring (214) and the spring retaining cap (216);
   a pin (302) passing through a cut-out (308) of the spring retaining cap (216), and a cut-out (310) in the mirror spring holder (212), wherein the mirror motor (210) is connected to the mirror mounting unit (300) through a motor shaft (218), wherein the motor shaft (218) passes through a hook (306), and wherein the mirror motor (210) is actuated in a linear motion; and
   a cleaning elastomer (312) connected to the mirror shutter motor (208), wherein the cleaning elastomer (312) is configured to move along the mirror (204), wherein a frontal surface of the mirror shutter (206) is a reflective surface functioning as a functioning mirror.

2. The vehicle mirror wiping unit (100) as claimed in claim 1, wherein the mirror spring (214) is compressed, and the pin (302) is fastened on to the mirror shaft (304) from inside of a vertical slot of the mirror spring holder (212).

3. The vehicle mirror wiping unit (100) as claimed in claim 1, wherein the spring retaining cap (216) is fixed fastened with a plurality of screws.

4. The vehicle mirror wiping unit (100) as claimed in claim 1, wherein the mirror shutter (206) is attached to a shutter spindle (402) on which the mirror shutter (206) is rolled.

5. The vehicle mirror wiping unit (100) as claimed in claim 4, wherein the mirror shutter (206) along with the shutter spindle (402) is mounted on a space provided in the mirror shutter holder (202).

6. The vehicle mirror wiping unit (100) as claimed in claim 1, wherein the mirror shutter motor (208) is mounted on the mirror shutter holder (202) and connected to the shutter spindle (402).

7. The vehicle mirror wiping unit (100) as claimed in claim 1, wherein the mirror shutter (206) is rolled up to the first end to cover the mirror (204) and is rolled down to the second end to uncover the mirror (204) by actuating the mirror shutter motor (208).

8. The vehicle mirror wiping unit (100) as claimed in claim 1, wherein the cleaning elastomer (312) in the mirror shutter (206) wipes the mirror (204).

9. The vehicle mirror wiping unit (100) as claimed in claim 1, wherein the mirror shutter motor (208) is actuated when the mirror (204) is completely pulled back.

10. The vehicle mirror wiping unit (100) as claimed in claim 1, wherein the mirror shutter motor (208) is actuated in a rotary motion to pull the mirror (204) from a bottom direction to a top direction.

* * * * *